May 21, 1946.  R. L. AKERS  2,400,728
STEERING DIFFERENTIAL
Filed Aug. 12, 1944
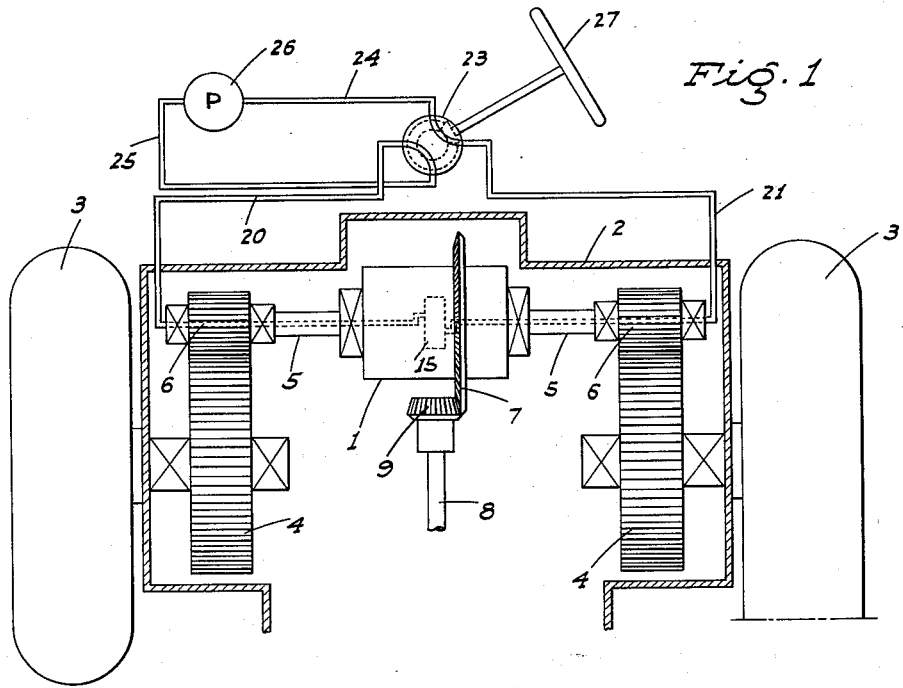
Fig. 1
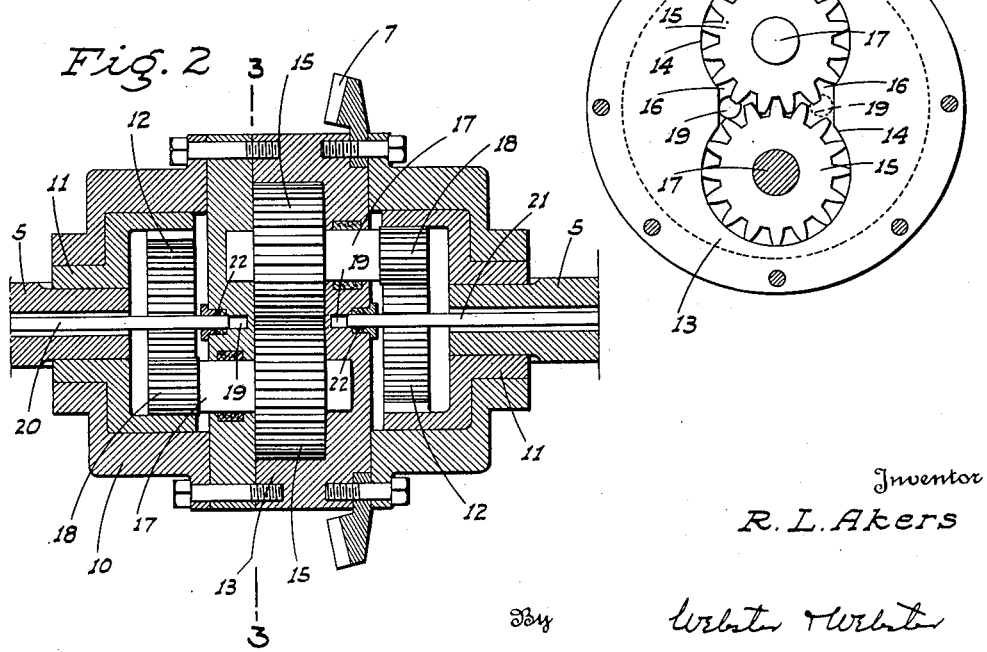
Fig. 2
Fig. 3
Inventor
R. L. Akers
By Webster & Webster
Attorneys Patented May 21, 1946

2,400,728

UNITED STATES PATENT OFFICE 2,400,728

STEERING DIFFERENTIAL

Richard L. Akers, Peoria, Ill., assignor to R. G. Le Tourneau, Inc., Stockton, Calif., a corporation of California Application August 12, 1944, Serial No. 549,159

9 Claims. (Cl. 180—17)

This invention relates in general to a differential for motor vehicles, and in particular the invention is directed to, and it is an object to provide, a manually controlled, power actuated differential whose purpose is to accomplish steering of the vehicle by impressing differential action upon opposed ground engaging wheels thereof. This is accomplished by applying external power to the differential gears in one direction or the other, the application of such power being under positive, constant, and selective control of the operator of the vehicle.

Another object of this invention is to provide a steering differential, as in the preceding paragraph, in which the means for applying the external power to the differential gears normally locks the same against relative rotation.

Another object of the invention is to provide a vehicle steering device in which the steering action is accomplished without dependence upon travel of the vehicle; the device being operative even when the vehicle is standing still.

A further object of the invention is to provide a power actuated, vehicle steering device in which steering is accomplished by a single manual control; the effort of the operator being reduced simply to that needed to operate a control valve or the like, and the power necessary to effect the change of direction of the vehicle is supplied to the steering device from the vehicle engine. The sharpness of the turn is proportionate to the extent of movement of said control.

An additional object is to provide a vehicle steering differential wherein the steering action is accomplished by the forceful application of differential rotation to the differential gears by means of a reversible hydraulic gear motor incorporated in novel manner in the device.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a schematic plan view of the device as embodied in a two-wheel tractor.

Figure 2 is an enlarged sectional elevation of the steering differential, detached.

Figure 3 is a cross-section on line 3—3 of Fig. 1.

Referring now more particularly to the characters of reference on the drawing, the steering differential, indicated generally at 1, is here shown schematically in Fig. 1 as embodied in a two-wheel tractor, which includes a tractor frame or housing 2 supported on opposite sides by ground engaging wheels 3 driven from within the housing 2 by relatively large-diameter drive gears 4. Axially alined tubular shafts 5 project from opposite ends of the differential 1 and carry pinions 6 which mesh with and drive the gears 4. The steering differential 1 includes a bevel ring gear 7 driven from the drive shaft 8 by means of a bevel drive pinion 9. The above assembly is carried in suitable bearings, as indicated diagrammatically.

The steering differential 1 comprises in detail the following structure, as illustrated in Figs. 2 and 3.

A rotary differential housing 10 carries the bevel ring gear 7, and is supported at its ends by the tubular drive shafts 5. The inner end of each shaft 5 projects into the housing 10 and is there splined into a hub 11 of an internal differential gear 12, the two gears 12 being spaced apart within the housing and being rotatable therein.

Between the differential gears 12 the housing 10 includes a cage 13 of a hydraulic gear motor which includes, within a substantially symmetrical gear pocket 14, a pair of meshing motor gears 15; the walls of pocket 14 closely following the periphery of said gears, except on opposite sides of the point of engagement of the gears where fluid receiving chambers 16 are provided.

The motor gears 15 each include a shaft 17, said shafts projecting laterally through opposite sides of the cage 13 to a termination therebeyond. At their outer ends the shafts 17 are fitted with differential pinions 18 which mesh with corresponding ones of the differential gears 12.

Ports 19 lead into the chambers 16 from opposite sides of the cage 13. Conduits 20 and 21 extend through corresponding ones of the tubular shafts 5, and said conduits at their inner ends extend through glands 22 in the sides of cage 13 and communicate with the corresponding port 19.

The conduits 20 and 21 lead to a four-way valve 23, which in turn is connected with the output and input conduits 24 and 25, respectively, of a variable displacement hydraulic pump 26 mounted on the vehicle and driven by the engine thereof. In other words the valve 23 is so interposed between conduits 20 and 21, and 24 and 25, that the output pressure from the variable displacement pump 24 may be directed, selectively, into the conduit 20 or the conduit 21, and to a controlled extent, depending on the adjusted position of said valve 23. As shown in Fig. 1, valve 23 is fully open to a position to feed the output pressure into conduit 21. The valve 23 is controlled by a manually actuated member, here shown as a steering wheel unit 27.

In operation of the above described steering differential, the valve 23 is normally closed relative to both conduit 20 and 21, which blocks flow therethrough and prevents any relative rotation between the gears 15 of the hydraulic gear motor. The shaft 8 is then driven from the conventional prime mover of the vehicle (not shown) and rotates the housing 10 through the medium of the gears 9 and 7. At this time the gears 15, being locked together, merely acts as drivers and impart the rotary motion of the housing 10 equally to the gears 12. Under these conditions it will be understood that the differential gears 12 are in effect locked against differential rotation. At this time the chambers 16 and the conduits 20 and 21 are filled with fluid. However, since pressure from the pump is cut off at the valve 23, this fluid is static and that which is in the chambers 16 moves as a body with the interlocked gears 15.

When the operator desires to turn the vehicle in one direction or the other the steering wheel unit 27 is correspondingly manually actuated, which opens the valve 23 and causes the introduction of hydraulic pressure into the corresponding one of conduits 20 or 21. When this occurs such pressure flows through one of the ports 19 and causes the hydraulic gear motor to operate; the motor gears 15 turning in opposite directions and through the connected pinions impressing opposite rotation upon the differential gears 12 and consequently the shafts 5 and wheels 3. This produces the desired steering of the vehicle, as there is a positive differential rotation between the opposed wheels 3.

The extent or sharpness of turning depends on the amount of opening of the valve 23, while the direction of turning is dependent upon the selective regulation of valve 23 to deliver output pressure from pump 26 to either conduit 20 or 21, i. e. delivery of such pressure to one or the other of chambers 16 from ports 19.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a motor vehicle, ground engaging wheels, a drive shaft, a differential housing connected in driving relation with said drive shaft, separate differential gears in the housing, each gear being coupled in driving relation to one of said wheels, and manually controlled power actuated means connected with said separate differential gears and operative to impart differential rotation to such gears, such means including a reversible hydraulic gear motor in the housing, such motor comprising a pair of meshing motor gears, a shaft projecting from each motor gear, and a pinion on each such gear shaft meshing with one of the separate differential gears.

2. In a motor vehicle, ground engaging wheels, a drive shaft, a differential housing connected in driving relation with said drive shaft, separate differential gears in the housing, each gear being coupled in driving relation to one of said wheels, a hydraulic gear motor mounted in the differential housing, such motor comprising a pair of meshing motor gears, driving means between each motor gear and one of such differential gears, and manually controlled means to cause actuation of said gear motor in selective directions.

3. In a motor vehicle, ground engaging wheels, a drive shaft, a differential housing connected in driving relation with said drive shaft, separate differential gears in the housing, each gear being coupled in driving relation to one of said wheels, a hydraulic gear motor mounted in the differential housing, such motor comprising a pair of meshing motor gears, driving means between each motor gear and one of such differential gears, and manually controlled means to cause actuation of said gear motor in selective directions; said manually controlled means including a hydraulic pump, a conduit system leading from the pump to opposite sides of the hydraulic gear motor, and a valve interposed in said conduit system, said valve being operative to cause hydraulic pressure to flow to either side of the motor.

4. A device as in claim 3 in which the valve includes a neutral position wherein flow to or from said motor is prevented.

5. A steering differential which comprises in combination with a differential housing and a drive shaft connected in driving relation with said housing, separate differential gears mounted in the housing, a hydraulic gear motor mounted in the housing, such motor including a pair of meshing motor gears, a shaft on each motor gear, a pinion on each shaft, each pinion being engaged in driving relation with one of the differential gears, and manually controlled means to feed pressure through said motor from opposite sides thereof selectively.

6. A steering differential which comprises in combination with a differential housing and a drive shaft connected in driving relation with said housing, separate differential gears journaled in the housing in spaced axial relation, a hydraulic gear motor mounted in the housing between said differential gears, such motor including meshing motor gears the axes of which are parallel to the axes of the differential gears, a shaft projecting axially from each motor gear and in opposite directions, a pinion on each shaft meshing with one of said differential gears, and a hydraulic pressure supply system coupled to said motor, such supply system including a manually controlled valve operative to cause hydraulic pressure to flow to said motor from either side thereof selectively.

7. A device as in claim 6 in which each of the differential gears is provided with an axial bore and said hydraulic gear motor includes a cage, said hydraulic pressure supply system including separate conduits each leading through one of said bores into the cage.

8. A steering differential which comprises in combination with a differential housing and a drive shaft connected in driving relation with said housing, separate differential gears in the housing, a hydraulic gear motor in the housing, said motor including a pair of oppositely driven motor gears, drive means between each motor gear and one of the differential gears, and a hydraulic pressure supply system coupled to the motor, said system including a pump and a manual control valve, operable to selectively cause the motor to drive in one direction or the other.

9. A steering differential which comprises in combination with a differential housing and a drive shaft connected in driving relation with said housing, separate differential gears in the housing, a hydraulic gear motor in the housing, said motor including a pair of oppositely driven motor gears, drive means between each motor gear and one of the differential gears, and a hydraulic pressure system coupled to the motor, said system including a pump and a manual control valve operable to selectively cause the motor to drive in one direction or the other or to block flow in said system to or from the motor.

RICHARD L. AKERS.